(12) United States Patent
Geagan et al.

(10) Patent No.: US 10,992,453 B2
(45) Date of Patent: Apr. 27, 2021

(54) SYSTEM ARCHITECTURE FOR ENCRYPTING EXTERNAL MEMORY

(71) Applicant: INTERNATIONAL BUSINESS MACHINES CORPORATION, Armonk, NY (US)

(72) Inventors: John B. Geagan, San Jose, CA (US); Dulce B. Ponceleon, San Jose, CA (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 137 days.

(21) Appl. No.: 15/158,314

(22) Filed: May 18, 2016

(65) Prior Publication Data

US 2017/0337141 A1   Nov. 23, 2017

(51) Int. Cl.
*G06F 11/30*   (2006.01)
*G06F 12/14*   (2006.01)
*H04L 9/00*   (2006.01)
*G06F 21/78*   (2013.01)
*G06F 21/75*   (2013.01)

(52) U.S. Cl.
CPC .............. *H04L 9/002* (2013.01); *G06F 21/75* (2013.01); *G06F 21/78* (2013.01); *G06F 2221/034* (2013.01)

(58) Field of Classification Search
CPC .............. G06F 12/1408; G06F 12/1027; G06F 21/554; G06F 12/1009; G06F 2212/1052; G06F 2212/65; G06F 2221/034; H04L 9/002

USPC ......................................................... 713/193
See application file for complete search history.

(56) References Cited

U.S. PATENT DOCUMENTS

| 7,734,920 | B2* | 6/2010 | Ishibashi | .............. | H04L 9/0822 |
| | | | | | 380/281 |
| 2006/0195705 | A1* | 8/2006 | Ehrensvard | .......... | B65D 5/4233 |
| | | | | | 713/194 |
| 2008/0313627 | A1 | 12/2008 | Segawa | | |
| 2009/0210517 | A1* | 8/2009 | Asami | .................... | G06Q 30/02 |
| | | | | | 709/219 |

(Continued)

FOREIGN PATENT DOCUMENTS

| CN | 101063994 A | 10/2007 |
| EP | 001990782 A2 | 11/2008 |

OTHER PUBLICATIONS

R. Elbaz,Hardware Engines for Bus Encryption: a Survey of Existing Techniques, IEE; 2005; page.*

(Continued)

*Primary Examiner* — Monjur Rahim
(74) *Attorney, Agent, or Firm* — Erik Huesits; Stephen Kenny; Foley Hoag, LLC

(57) ABSTRACT

A system architecture providing memory encryption suitable for protection against liquid nitrogen and trace probe attacks. In one embodiment, a method of and system for memory encryption are provided. A write request is received at a memory controller. The write request includes first data and a first address. The memory controller is embedded in a CPU and is operatively coupled to memory external to the CPU. The first data are encrypted at the memory controller to generate encrypted first data. The encrypted first data are written to the memory.

14 Claims, 8 Drawing Sheets

(56) References Cited

U.S. PATENT DOCUMENTS

| | | | |
|---|---|---|---|
| 2010/0031059 A1* | 2/2010 | Laackmann | G06F 12/1458 713/193 |
| 2011/0064217 A1* | 3/2011 | Fry | G06F 21/62 380/46 |
| 2012/0079289 A1* | 3/2012 | Weng | G06F 21/79 713/193 |
| 2012/0254626 A1* | 10/2012 | Arai | G06F 21/79 713/189 |
| 2012/0260023 A1* | 10/2012 | Nagai | G06F 21/31 711/103 |
| 2012/0311239 A1* | 12/2012 | Debout | H04L 9/06 711/103 |
| 2013/0022201 A1* | 1/2013 | Glew | G06F 21/87 380/268 |
| 2013/0036314 A1* | 2/2013 | Glew | G06F 12/1408 713/194 |
| 2013/0042298 A1 | 2/2013 | Plaza Fonseca et al. | |
| 2013/0097417 A1* | 4/2013 | Lauter | H04L 9/008 713/150 |
| 2013/0145177 A1* | 6/2013 | Cordella | G06F 12/1408 713/193 |
| 2013/0262880 A1* | 10/2013 | Pong | G06F 12/1441 713/193 |
| 2014/0037093 A1* | 2/2014 | Park | H04L 9/0816 380/277 |
| 2014/0281587 A1* | 9/2014 | Ignatchenko | G06F 21/64 713/193 |
| 2015/0095661 A1* | 4/2015 | Sell | G06F 12/1408 713/193 |
| 2015/0371063 A1* | 12/2015 | Van Antwerpen | G06F 21/80 713/190 |

OTHER PUBLICATIONS

G. Edward Suh, et al., "Efficient Memory Integrity Verification and Encryption for Secure Processors", IEEE, 2003.

R. Elbaz, et al., "Hardware Engines for Bus Encryption: a Survey of Existing Techniques", IEEE, 2005.

Jonathan Graf, "A Key Management Architecture for Securing Off-Chip Data Transfers", © Springer-Verlag Berlin Heidelberg, 2004.

* cited by examiner

SYSTEM ARCHITECTURE FOR ENCRYPTING EXTERNAL MEMORY

BACKGROUND

Embodiments of the present invention relate to encrypting external memory, and more specifically, to a system architecture providing memory encryption suitable for protection against liquid nitrogen and trace probe attacks.

BRIEF SUMMARY

According to one embodiment of the present invention, a method of and system for memory encryption are provided. A write request is received at a memory controller. The write request includes first data and a first address. The memory controller is embedded in a CPU and is operatively coupled to memory external to the CPU. The first are is encrypted at the memory controller to generate encrypted first data. The encrypted first data are written to the memory.

DETAILED DESCRIPTION

Figure 1:
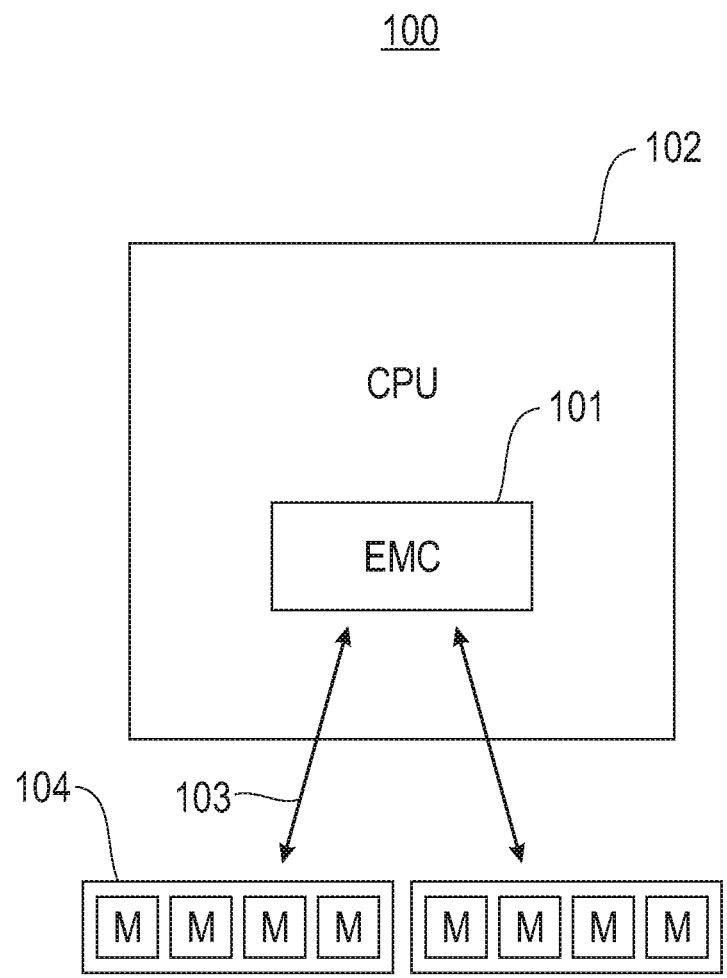
FIG. 1 depicts an encrypted memory controller according to embodiments of the present disclosure.

Conventional memory is vulnerable to "liquid nitrogen" attacks. The contents of memory such as DRAM, rather than being immediately lost when power is cut, slowly fade over time. At room temperature, memory contents can persist in retrievable form for as much as several minutes. Cooling via readily available tools like canned air to temperatures of about −50° C. allows memory contents to persist for ten minutes or more. Cooling in liquid nitrogen to temperatures of about −196° C. allows data to persist for hours. The memory contents can then be read by rebooting into a specially crafted operating system or by moving the memory chips into a specially prepared computer.

The ability to retrieve memory contents in this manner poses a significant risk for any system that relies on an in-memory secret. It poses a particularly acute risk for disk encryption products. These products rely on a master key maintained in DRAM, operating on the assumption that the key will not persist once power was terminated. However, by cooling the memory, rebooting into a specially crafted operating system, and then copying the contents of memory, an attacker can search for encryption keys that were stored in memory. Using located keys, hard disk contents can be decrypted at the attacker's convenience.

Similarly, memory such as DRAM is subject to "trace probe snooping." In such attacks, plaintext data leaked through side channels is analyzed to reconstruct the control-flow graph of a program or to extract secret values such as keys.

Virtual memory is also vulnerable to recovery of secret data, by inspection of the swap file on disk. The addition of software-implemented encryption for a swap volume can lead to substantial performance decreases that are unsuitable for virtual memory.

In order to address these and other vulnerabilities of system memory, the present disclosure provides for an encrypted memory controller. Encrypted memory controllers according to embodiments of the present disclosure transparently and automatically encrypt data as they pass from the CPU out to memory, and decrypts data when they are read into the CPU. These encryption and decryption steps are implemented without a significant negative impact on performance.

According to embodiments of the present disclosure, cryptographic keys and any necessary parameters are maintained internally to the memory controller and are not readable by the rest of. the CPU. Memory controllers according to certain embodiment of the present disclosure support a destruct signal. Upon receipt of such a destruct signal, internal data such as cryptographic keys are cleared. In various embodiments, the destruct signal is triggered by software. In some embodiments, the destruct signal is wired to a physical external tamper or case intrusion circuit, allowing cryptographic data to be cleared upon case intrusion or tampering.

In various embodiments, attestation is included in a memory controller according to the present disclosure. In this way, software running on a system can be assured that data are not being stored into memory in the clear.

Memory controllers according to the present disclosure can be placed in various locations within the system architecture. In some embodiments, the memory controller is embedded in the CPU. In other embodiments, the memory controller is a discrete component. In some such embodiments, the memory controller is a shim socket that plugs between the memory socket and the memory.

In some embodiments, the memory controller received instructions to encrypt or not encrypt memory on a per-page basis. In this way, should encryption result in undesirable slowdown, it may be disabled where not needed. For example, no encryption or decryption step is necessary where encrypted memory is simply being transferred. By suppressing encryption/decryption for such transactions, the encrypted memory pages can safely just go directly to/from disk results.

According to the present disclosure, memory (including virtual memory on disk) is not present in the clear outside of the CPU. Thus, a liquid nitrogen attacker or trace probe snooper will end up with (useless) encrypted data and be unable to recover the underlying unencrypted data.

With reference now to FIG. 1, an encrypted memory controller according to the present disclosure is depicted. Encrypted memory controller 101 is located within CPU 102. Each read and write request 103 from CPU 102 to memory 104 is channeled through memory controller 101. In this physical configuration, there is no exposure to trace snooping, because data are not transmitted or stored in the clear outside of CPU 102.

Figure 2:
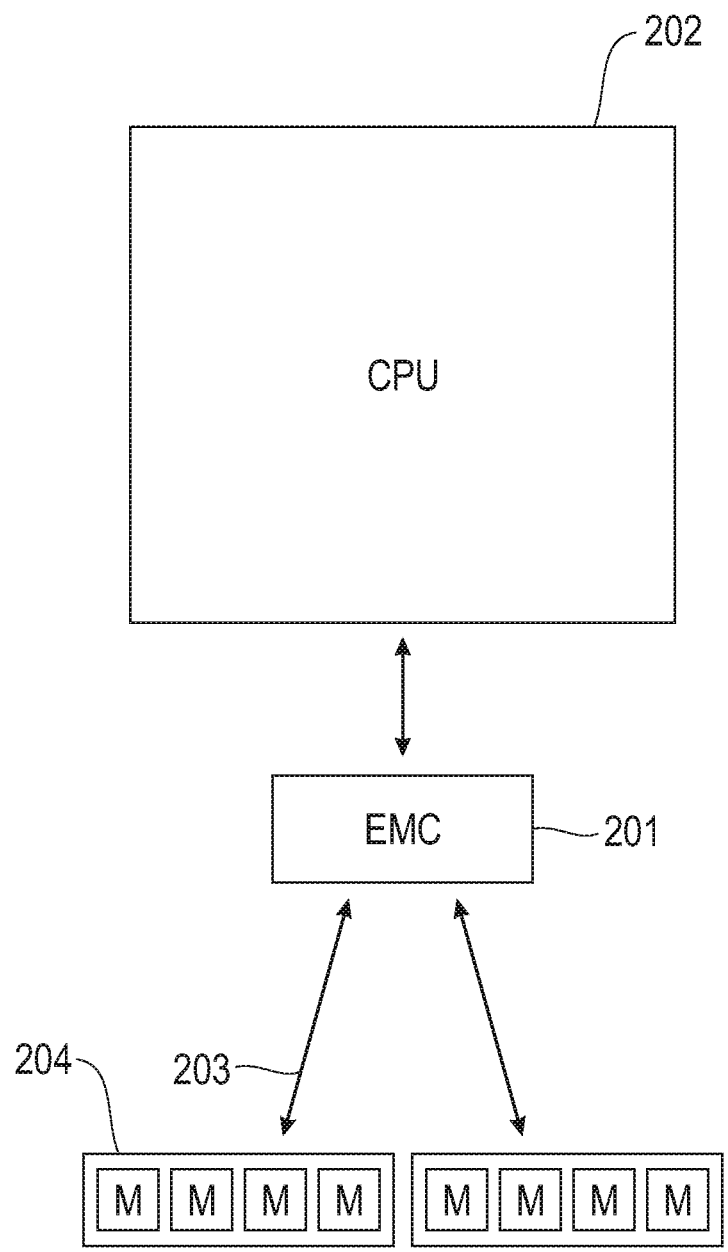
FIG. 2 depicts an encrypted memory controller according to additional embodiments of the present disclosure.

With reference now to FIG. 2, an alternative memory controller according to the present disclosure is depicted. Encrypted memory controller 201 is located outside CPU 202. Each read and write request 203 from CPU 202 to memory 204 is channeled through memory controller 201. In this physical configuration, there is potential exposure to trace snooping between the CPU and the memory controller. However, because data are encrypted before reaching memory 204, a liquid nitrogen attack is guarded against.

Figure 3:
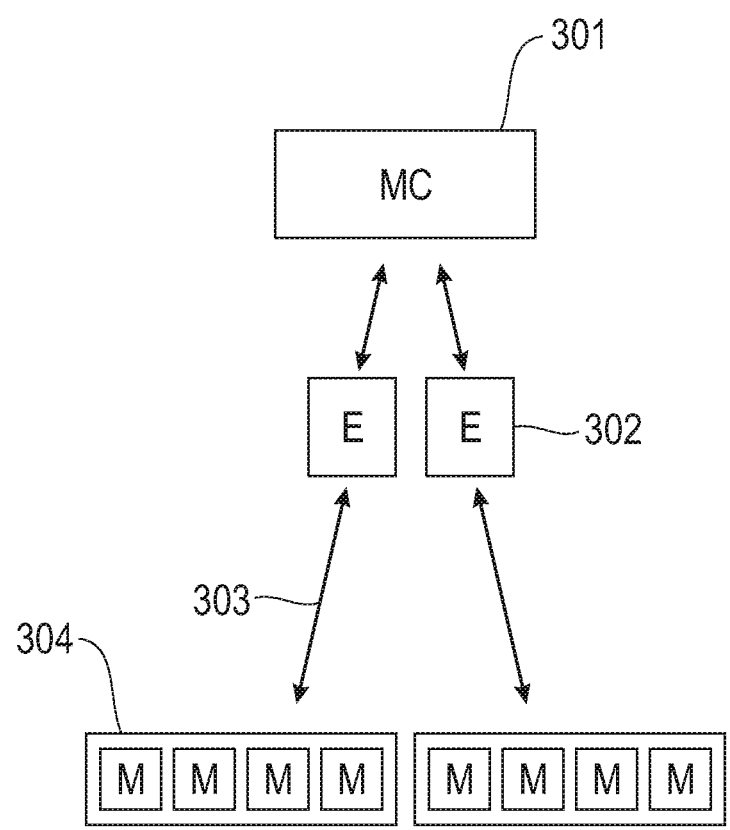
FIG. 3 depicts an encrypted memory controller according to additional embodiments of the present disclosure.

With reference now to FIG. 3, another alternative memory controller according to the present disclosure is depicted. In this embodiment, memory controller 301 is separated from encryption module 302. Each read and write request 303 from the CPU is channeled through memory controller 301 and encryption module 302 before reaching memory 204. In such embodiments, memory controller 301 need not be aware of encryption module 302, and so encryption module 302 is suitable for retrofitting. In this physical configuration, there is potential exposure to trace snooping between memory controller 301 and encryption module 302. However, because data are encrypted before reaching memory 304, a liquid nitrogen attack is guarded against.

Figure 4:
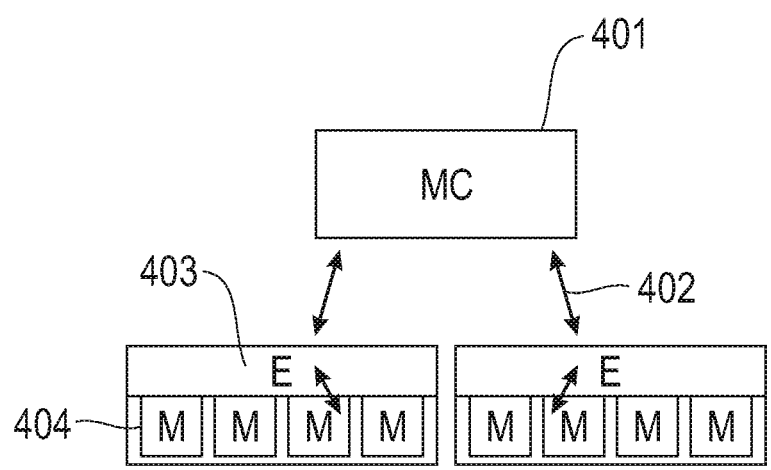
FIG. 4 depicts an encrypted memory controller according to additional embodiments of the present disclosure.

With reference now to FIG. 4, another alternative memory controller according to the present disclosure is depicted. In this embodiment, memory controller 401 is separated from encryption module 402, which resides in a shim socket. Each read and write request 403 from the CPU is channeled through memory controller 401 and encryption module 402 before reaching memory 404. In such embodiments, memory controller 401 need not be aware of encryption module 402, and so encryption module 402 is suitable for retrofitting. In this physical configuration, there is potential exposure to trace snooping between memory controller 401 and encryption module 402. However, because data are encrypted before reaching memory 404, a liquid nitrogen attack is guarded against.

Figure 5:
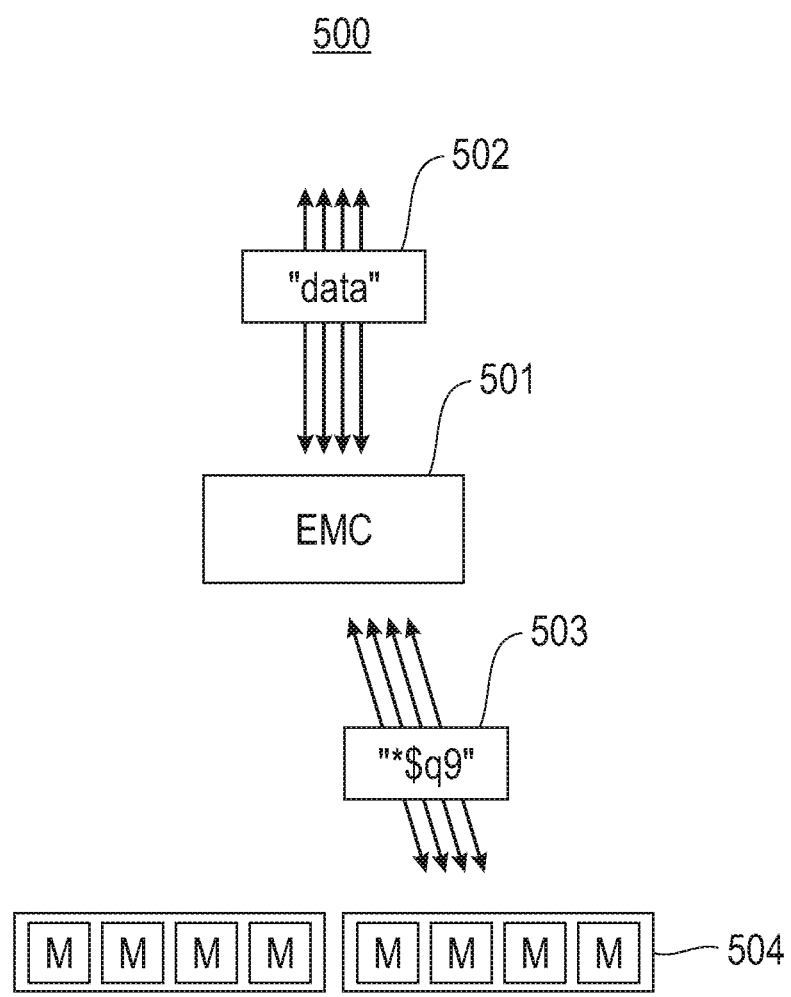
FIG. 5 illustrates data encryption by an encrypted memory controller according to embodiments of the present disclosure.

With reference now to FIG. 5, data encryption according to embodiments of the present disclosure is illustrated. Encrypted memory controller 501 encrypts data 502 to create encrypted data 503 before writing it to memory 504. Encrypted memory controller 501 decrypts data for each read request.

Figure 6:
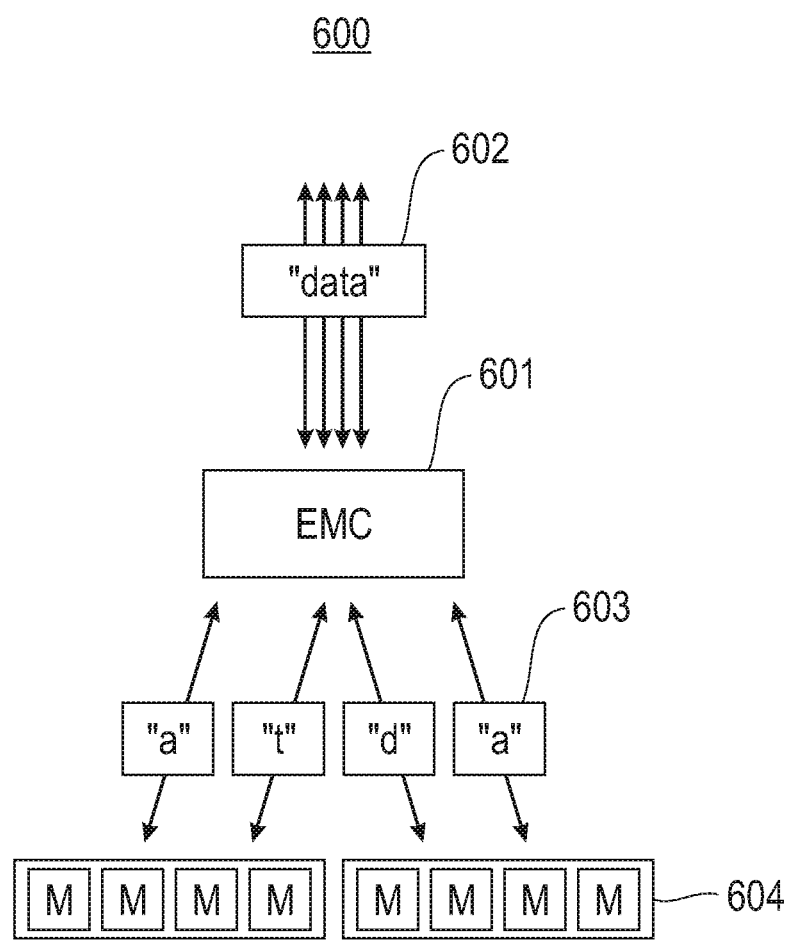
FIG. 6 illustrates location encryption by an encrypted memory controller according to embodiments of the present disclosure.

With reference now to FIG. 6, location encryption according to embodiments of the present disclosure is illustrated. Encrypted memory controller 601 reorders data 602, resulting in reordered data 603, before writing to memory 604. Encrypted memory controller 601 performs the reverse transformation for each read request.

Figure 7:
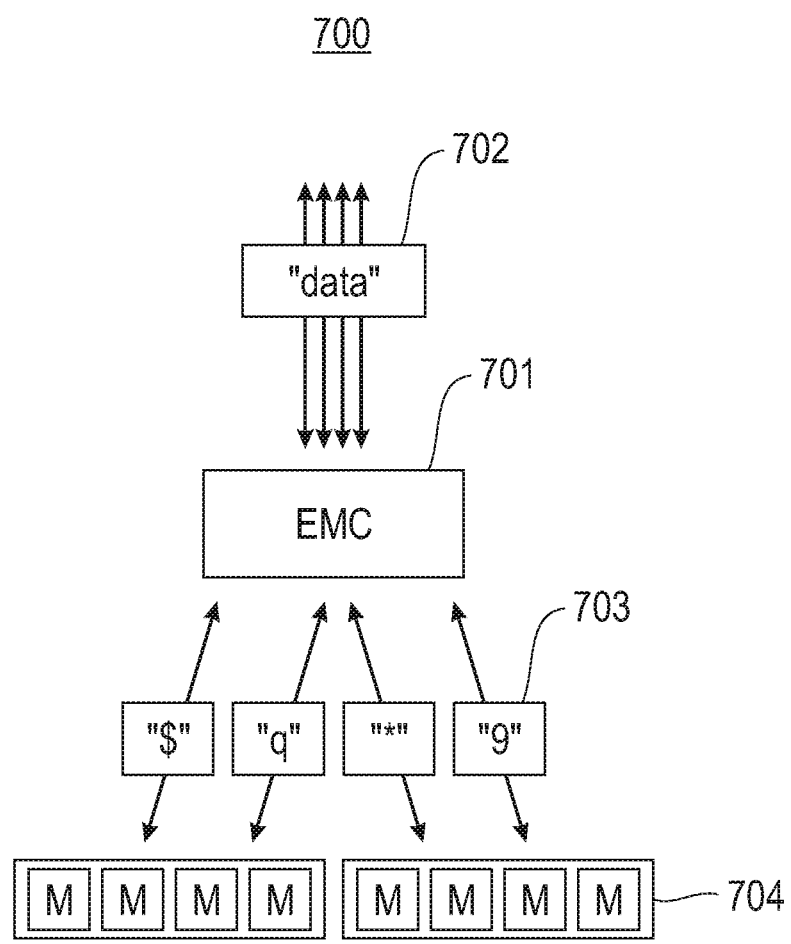
FIG. 7 illustrates location and data encryption by an encrypted memory controller according to embodiments of the present disclosure.

With reference now to FIG. 7, data and location encryption according to embodiments of the present disclosure are illustrated. Encrypted memory controller 701 both reorders and encrypts data 702 to create encrypted and reordered data 703 prior to writing to memory 704. Encrypted memory controller 701 performs the reverse transformation for each read request.

Various encryption methods are suitable for use in accordance with the present disclosure. For example, various embodiments use ciphers known in the art including AES, Blowfish, C2 block cipher, Camellia, CAST-128, CAST-256, CLEFIA, Cryptomeria, DES, FEAL, GOST 28147-89, ICE, IDEA, KASUMI, LOKI97, Lucifer, MacGuffin, MAGENTA, MARS, MISTY1, RC2, RC5, RC6, Skipjack, SMS4, TEA, Triple DES, Twofish, and XTEA. In other embodiments, stream ciphers known in the art are used such including A5/1, A5/2, Achterbahn-128/80, CryptMT, FISH, Grain, HC-256, ISAAC, MUGI, PANAMA, Phelix, Pike, Py, Rabbit, RC4, Salsa20, Scream, SEAL, SNOW, SOBER-128, SOSEMANUK, Trivium, Turing, VEST, and WAKE. In general, encryption methods with low latency and that are too computationally complex to efficiently crack are suitable.

As set forth above, various embodiments encrypt both memory contents and memory addresses. In this way, the same encrypted data are not repeated in a predictable pattern. For example, if memory addresses were not varied, commonly occurring values such as strings of zeros would appear in encrypted form throughout the memory. This repetition of patterns has the potential to weaken the encryption.

In some embodiments, the logical address is used in the encryption scheme to yield a non-sequential physical address. In this way, virtual memory can swap out to disk and back in to another physical address without decryption. As noted above, the operating system can tell the memory controller not to encrypt certain operations on certain pages. This is useful for virtual memory paging, so the encrypted memory pages can safely go directly to/from disk without re-encrypting and such pages stay encrypted even on disk.

To avoid potential attacks utilizing direct memory access (DMA), the secret keys or parameters used to encrypt are initialized at power-up using a random number generator. In some embodiments, a private algorithm is used in conjunction with circuitry that is not externally readable and thus not exposed for probing. In addition, in some embodiments the keys or parameters are maintained in volatile storage such as eDRAM within the controller itself. In other embodiments the keys or parameters are stored in non-volatile storage coupled with a self-destruct that is triggered upon tampering.

In some embodiments, the key or parameter storage is placed physically deep within the memory controller, thus avoiding exposure to side-channel snooping. In some embodiments, the storage is surrounded by one or more self-destruct circuits to detect tampering.

In some embodiments, the encryption keys or parameters are applicable to a subset of the memory. In some such embodiments, different keys or parameters are applied on a per-page basis. In various other embodiments, smaller or larger increments are used. In some embodiments, a plurality of keys or parameters are derived from master keys or parameters.

In some embodiments, instead of zeroing a no-longer-needed page, the operating system signals a change in keys for that page. In this way, no time is spent zeroing memory, but any existing data are rendered unreadable by the change in keys. In some embodiments, an operating system or hypervisor uses different keys on a per-process or per-thread basis in order to prevent inter-process or inter-thread reads.

In some embodiments, when a self-destruct signal is sent, the memory controller zeroes out the internal keys and/or encryption parameters. In other embodiments, the internal keys and/or encryption parameters are scrambled. In this way, the data become irretrievable. In addition, the computer will very quickly crash. In some embodiments, the memory controller additionally writes zeros or random data to memory as fast as possible, thereby further thwarting any data recovery. In some embodiments, the intrusion detection device is wired to propagate a self-destruct signal to any other peer channel controllers.

In various embodiments, the self-destruct signal is initiated by a variety of software and hardware switches. In some embodiments, a hypervisor signal initiates self-destruct. In some embodiments, a special CPU instruction initiates self-destruct. In some embodiments, a memory controller command initiates self-destruct. In some embodiments, accessing a special memory address initiates self-destruct. In some embodiments, case opening initiates self-destruct. In some embodiments, reading/writing to a special address initiates self-destruct. In some embodiments, a power loss initiates self-destruct. In some embodiments, a sudden change in temperature initiates self-destruct.

Encryption and decryption can result in increased memory latency. To mitigate the impact, various embodiments use low-latency crypto. In some embodiments, a variety of encryption algorithms are applied to provide variable latency for different pages or regions of memory. Some embodiments apply pipelining to minimize the latency. Some embodiments parallelize the process by calculating in advance. In some embodiments, keys are pre-calculated or cached. In some embodiments, higher-speed memory components are used while maintaining a lower rating. For example, encrypted DDR4/8000 can report as DDR3/2000.

Figure 8:
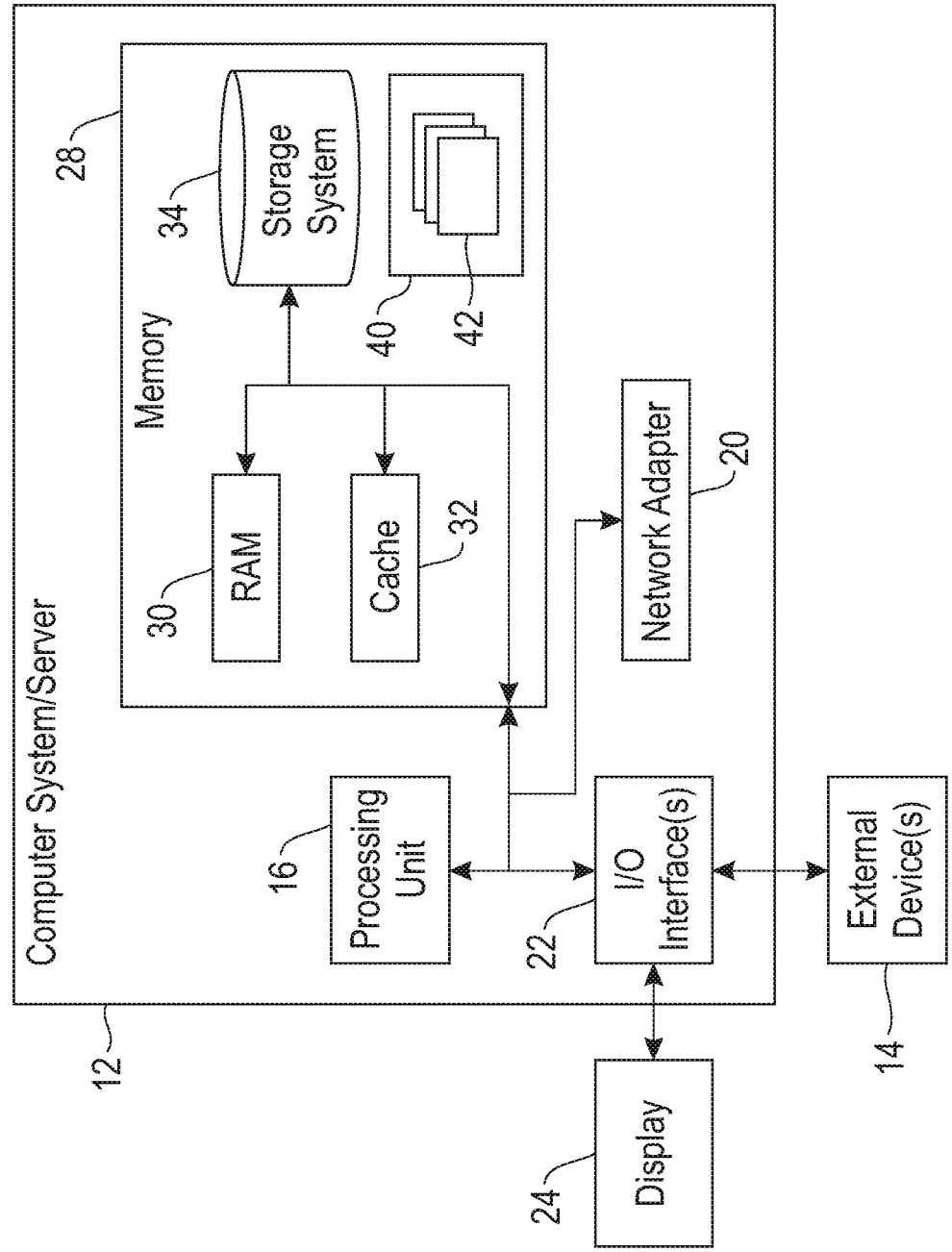
FIG. 8 depicts a computing node according to an embodiment of the present invention.

Referring now to FIG. 8, a schematic of an example of a computing node is shown. Computing node 10 is only one example of a suitable computing node and is not intended to suggest any limitation as to the scope of use or functionality of embodiments of the invention described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
    receiving at a memory controller a write request, the write request comprising first data and a first address, the memory controller being embedded in a CPU and operatively coupled to memory external to the CPU, said memory controller contained within a case;

encrypting, at the memory controller, the first data to generate encrypted first data, wherein encrypting the first data comprises:
reading at the memory controller a first cryptographic key from a volatile memory within the memory controller, and
applying the first cryptographic key to the first data;

writing the encrypted first data to the memory;

detecting a physical intrusion of the case; and deleting the first cryptographic key and one or more encryption parameters upon detection of the physical intrusion.

2. The method of claim 1, further comprising:
receiving at the memory controller a read request, the read request comprising a second address;
reading encrypted second data from the memory;
decrypting, at the memory controller, the encrypted second data to generate second data.

3. The method of claim 1, further comprising:
determining a first translated address from the first address, and wherein the encrypted first data are written to the memory at the first translated address.

4. The method of claim 2, further comprising:
determining a second translated address from the second address, and wherein the encrypted second data are read from the memory at the second translated address.

5. The method of claim 1, further comprising:
generating the first cryptographic key upon powering of the memory controller.

6. The method of claim 3, wherein determining the first translated address comprises:
applying a cryptographic function.

7. The method of claim 4, wherein determining the second translated address comprises:
applying a cryptographic function.

8. The method of claim 1, wherein encrypting the first data comprises:
reading at the memory controller a first cryptographic key of a plurality of cryptographic keys, the first cryptographic key being selected on the basis of the first address; and
applying the first cryptographic key to the first data.

9. A system comprising:
a case;
a memory controller contained within the case, the memory controller being embedded in a CPU and being operatively coupled to a memory external to the CPU, the memory controller adapted to:
receive a write request, the write request comprising first data and a first address;
encrypt the first data to generate encrypted first data, wherein encrypting the first data comprises:
reading at the memory controller a first cryptographic key from a volatile memory within the memory controller, and
applying the first cryptographic key to the first data;
write the encrypted first data to the memory;
detect a physical intrusion of the case; and
delete the first cryptographic key and one or more encryption parameters upon detection of the physical intrusion.

10. The system of claim 9, wherein the memory controller is further adapted to:
receive a read request, the read request comprising a second address;
read encrypted second data from the memory;
decrypt at the memory controller the encrypted second data to generate second data.

11. The system of claim 9, wherein the memory controller is further adapted to:
determine a first translated address from the first address, and wherein the encrypted first data are written to the memory at the first translated address.

12. The system of claim 10, wherein the memory controller is further adapted to:
determine a second translated address from the second address, and wherein the encrypted second data are read from the memory at the second translated address.

13. The system of claim 9, wherein the memory controller is further adapted to:
generate the first cryptographic key upon powering of the memory controller.

14. The system of claim 9, wherein encrypting the first data comprises:
reading a first cryptographic key of a plurality of cryptographic keys, the first cryptographic key being selected on the basis of the first address; and
applying the first cryptographic key to the first data.

* * * * *